US008018411B2

(12) United States Patent
Chang et al.

(10) Patent No.: US 8,018,411 B2
(45) Date of Patent: Sep. 13, 2011

(54) THIN FILM TRANSISTOR ARRAY PANEL AND METHOD FOR MANUFACTURING THE SAME

(75) Inventors: Hak-Sun Chang, Gyeonggi-do (KR);
Yoon-Sung Um, Gyeonggi-do (KR);
Seung-Hoo Yoo, Gyeonggi-do (KR);
Hyun-Wuk Kim, Gyeonggi-do (KR);
Hee-Wook Do, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1191 days.

(21) Appl. No.: 11/480,680

(22) Filed: Jul. 3, 2006

(65) Prior Publication Data

US 2007/0002251 A1    Jan. 4, 2007

(30) Foreign Application Priority Data

Jul. 4, 2005   (KR) .................. 10-2005-0059673

(51) Int. Cl.
*G09G 3/36*   (2006.01)

(52) U.S. Cl. .......................................... 345/87; 345/89

(58) Field of Classification Search .......... 345/204–206, 345/690–693, 87–100
See application file for complete search history.

(56) References Cited

U.S. PATENT DOCUMENTS

| 6,388,727 | B1 | 5/2002 | Kim et al. | |
|---|---|---|---|---|
| 6,636,289 | B2 | 10/2003 | Yoo et al. | |
| 6,791,525 | B2 * | 9/2004 | Matsumura et al. | 345/100 |
| 7,277,076 | B2 * | 10/2007 | Shiomi et al. | 345/89 |

FOREIGN PATENT DOCUMENTS

| JP | 2001-228480 | 8/2001 |
|---|---|---|
| JP | 2002-122841 | 4/2002 |
| JP | 2002-333626 | 11/2002 |
| JP | 2004-354407 | 12/2004 |
| JP | 2005-10380 | 1/2005 |
| KR | 1999-009004 | 2/1999 |
| KR | 10-0304916 | 7/2001 |
| KR | 10-0373380 | 9/2001 |
| KR | 10-0403648 | 10/2003 |

(Continued)

OTHER PUBLICATIONS

Matsumoto et al., English Translation of Korean Patent Pub. No. KR2002-0015001, published Feb. 27, 2002, 47 pp.*

(Continued)

*Primary Examiner* — Nitin Patel
(74) *Attorney, Agent, or Firm* — Innovation Counsel LLP

(57) ABSTRACT

A liquid crystal display device having a first substrate and a second substrate facing the first substrate, a liquid crystal layer interposed between the first substrate and the second substrate, a pixel electrode formed over the first substrate, a common electrode formed over the first substrate with insulating from the pixel electrode, wherein a portion of the common electrode overlaps with the pixel electrode, includes a gray voltage generator generating a plurality of gray voltages, an image signal modification assembly configured to receive a first image signal, a second image signal, and a third image signal for subsequent three frames and modify the second image signal based on the first image signal and the third image signal, and a data driver configured to provide a data voltage selected from the plurality of gray voltages to the pixel electrode corresponding to the modified signal in the image signal modification assembly. A longitudinal axis of the liquid crystal molecule is inclined at an angle with a longitudinal pixel electrode.

21 Claims, 16 Drawing Sheets

FOREIGN PATENT DOCUMENTS

| KR | 2004-0061946 | 7/2004 |
|---|---|---|
| KR | 2004-0087426 | 10/2004 |
| KR | 2005-0008494 | 1/2005 |
| KR | 2005-0020242 | 3/2005 |

OTHER PUBLICATIONS

Song, English Translation of Korean Patent Pub. No. 10-2004-0087426, published Oct. 14, 2004, 39 pp.*
Patent Abstracts of Japan, Publication No. 2001-228480, Aug. 24, 2001, 2 pp.
Patent Abstracts of Japan, Publication No. 2002-122841, Apr. 26, 2002, 2 pp.
Patent Abstracts of Japan, Publication No. 2002-333626, Nov. 22, 2002, 2 pp.
Patent Abstracts of Japan, Publication No. 2004-354407, Dec. 16, 2004, 2 pp.
Patent Abstracts of Japan, Publication No. 2005-010380, Jan. 13, 2005.
Korean Patent Abstracts, Publication No. 1020000013241, Mar. 6, 2000, 2 pp.
Korean Patent Abstracts, Publication No. 100282329, Nov. 28, 2000, 1 p.
Korean Patent Abstracts, Publication No. 1020010087107, Sep. 15, 2001, 1 p.
Korean Patent Abstracts, Publication No. 1020050020242, Mar. 4, 2005, 2 pp.
Korean Patent Abstracts, Publication No. 1020020015001, Feb. 27, 2002, 2 pp.
Korean Patent Abstracts, Publication No. 1020040061946, Jul. 7, 2004, 2 pp.
Korean Patent Abstracts, Publication No. 1020040087426, Oct. 14, 2004, 2 pp.
Korean Patent Abstracts, Publication No. 1020050008494, Jan. 21, 2005, 2 pp.

* cited by examiner

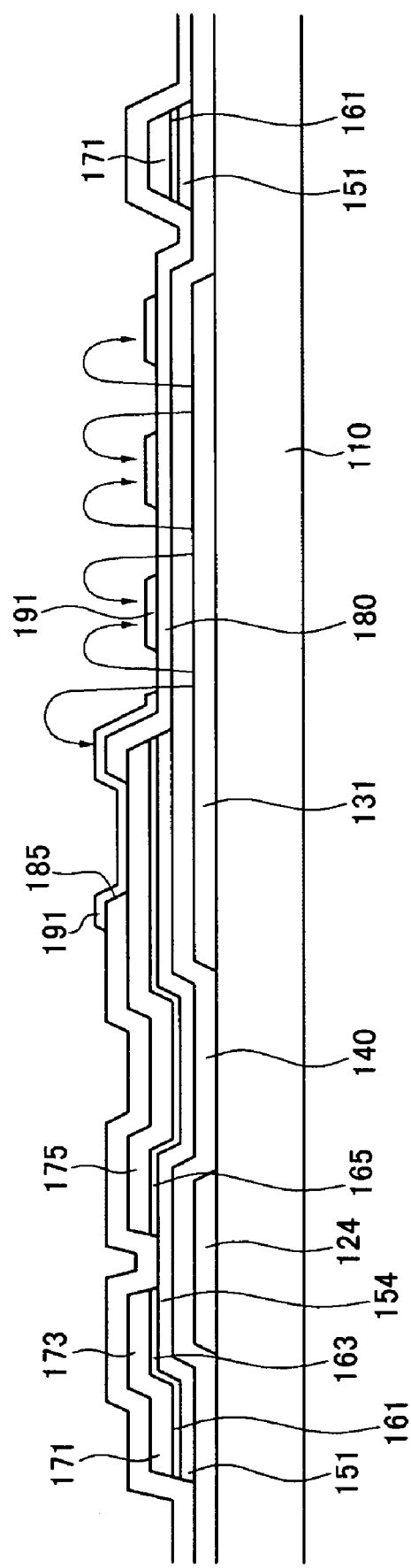

THIN FILM TRANSISTOR ARRAY PANEL AND METHOD FOR MANUFACTURING THE SAME

CROSS-REFERENCE TO RELATED APPLICATION

This application claims priority to Korean Patent Application No. 2005-0059673 filed on Jul. 4, 2005, the disclosure of which is hereby incorporated herein by reference in its entirety for all purposes.

BACKGROUND

1. Field of the Invention

The present invention relates generally to liquid crystal displays (LCDs) and a method of driving the same.

2. Description of Related Art

A liquid crystal display (LCD) is one of the most widely used flat panel displays. An LCD includes two panels provided with field-generating electrodes (i.e., a pixel electrode and a common electrode) and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

For wide viewing angles, a vertical alignment (VA) mode LCD device having cutouts in the field-generating electrodes or protrusions on the field-generating electrodes, an in-plane switching (IPS) mode LCD device, and a fringe filed switching filed (FFS) mode LCD device have been developed.

IPS mode LCD devices and FFS mode LCD devices include the pixel electrode and the common electrode having an insulating layer therebetween on the same panel. The pixel electrode and the common electrode overlap to generate a storage capacitance, thereby reducing an aperture ratio (i.e., area which transmits light) of displaying image and decreasing luminance.

In the meantime, for decreasing a response time, LC molecules in IPS mode and FFS mode LCDs are aligned to have a pre-twist angle without applying voltage. However, this pre-twisting angle reduces the rotation angle range, thereby decreasing luminance.

Accordingly, there is need for decreasing a response time and increasing luminance at the same time.

SUMMARY

The present invention provides a LCD device and a method for driving thereof, which may increase a response speed of LC molecules and reduce a loss of luminance of LCD device. In an exemplary LCD device according to the present invention, the LCD device includes a first substrate, a second substrate facing the first substrate, a liquid crystal layer interposed between the first substrate and the second substrate, a pixel electrode formed over the first substrate, a common electrode formed over the first substrate with insulating from the pixel electrode, where a portion of the common electrode overlaps with the pixel electrode, a gray voltage generator generating a plurality of gray voltages, an image signal modification assembly configured to receive a first image signal, a second image signal, and a third image signal for subsequent three frames and modify the second image signal based on the first image signal and the third image signal, and a data driver configured to provide a data voltage selected from the plurality of gray voltages to the pixel electrode corresponding to the modified signal in the image signal modification assembly. A longitudinal axis of the liquid crystal molecule can be inclined at an angle with respect to the length of the pixel electrode. The angle can be greater than 0 degree and less than or equal to 10 degrees.

The image signal modification assembly generates a first modified image signal based on the first image signal and the second image signal, and then generates a second modified image signal based on the first modified image signal and the third image signal.

In another exemplary LCD device according to the invention, the LCD display device includes a first substrate and a second substrate facing with the first substrate, a liquid crystal layer interposed between the first substrate and the second substrate, a pixel electrode formed over the first substrate, a common electrode formed over the second substrate that is insulated from the pixel electrode, where a portion of the common electrode overlaps with the pixel electrode, a gray voltage generator generating a plurality of gray voltages, an image signal modification assembly configured to receive a first image signal, a second image signal, and a third image signal for subsequent three frames, and generate a first modified signal based on the first image signal and the second image signal and a second modified signal based on the first modified signal and the third image signal, a data driver configured to provide a data voltage selected from the plurality of gray voltages to the pixel electrode corresponding to the second modified signal in the image signal modification assembly. A longitudinal axis of the liquid crystal molecule can be inclined at an angle with respect to a longitudinal axis of the pixel electrode.

The angle can be less than 0 degrees and greater than or equal to 10 degrees. The pixel electrode can have a bent portion.

The second modified signal is equal to a first correction constant when the first modified signal is less than a first value and the third image signal is larger than a second value. The second modified signal is equal to the sum of the first modified signal and a second correction constant when the first modified signal is less than a first value and the third image signal is larger than a second value. The second modified signal is equal to the first modified signal when the first modified signal is larger than the first value or the third image signal is less than the second value. The modified first signal is larger than the second image signal when the first signal is less than the second image signal.

The image signal modification assembly can include a first frame memory configured to output the second image signal and store the third image signal, a second frame memory configured to output the first image signal and the store the second image signal, a first modification unit configured to generate the first modified signal based on the second image signal from the first frame memory and the first image signal from the second frame memory, and a second modification unit configured to generate the second modified signal based on the first modified signal from the first modification unit and the third image signal.

In another exemplary of LCD device, the LCD device can include a first substrate and a second substrate facing with the first substrate, a common electrode formed over either the first substrate or the second substrate, a pixel electrode formed over the same substrate where the common electrode is formed, a liquid crystal layer interposed between the first substrate and the second substrate, a gray voltage generator generating a plurality of gray voltages, an image signal modification assembly configured to receive a first image signal, a second image signal, and a third image signal for subsequent three frames, and generate a first modified signal based on the first image signal and the second image signal and a second modified signal based on the first modified signal and the third image signal, and a data driver configured to provide a data voltage selected from the plurality of gray voltages to the pixel electrode corresponding to the second modified signal in the image signal modification assembly. A longitudinal axis of the liquid crystal molecule is inclined at an angle with respect to a longitudinal axis of the pixel electrode. The angle can be greater than zero and less than or equal to ten degrees.

The pixel electrode and the common electrode can have transverse parts and longitudinal parts, wherein the longitudinal part has a bent shape.

The longitudinal parts of the pixel electrode can be disposed alternately with and in parallel with the longitudinal parts of the common electrode.

In a exemplary method of driving a LCD device including a pixel electrode and a common electrode formed over a same substrate, a plurality of pixels defined by a gate line and a data line, a liquid crystal molecule aligned between the pixel electrode and the common electrode, where the liquid crystal molecule is inclined at a range of angle larger than zero and less than or equal to ten degrees with a longitudinal direction of the pixel electrode according to the invention, the method comprises generating a plurality of gray voltages, receiving a first image signal, a second image signal, and a third image signal for subsequent three frames, generating a first modified signal based on the first image signal and the second image signal, generating a second modified signal based on the first modified signal and the third image signal, selecting a data voltage from the plurality of gray voltages corresponding to the second modified signal, and providing the data voltage to the pixel.

Generating the second modified signal further includes comparing the first modified signal with a first value, comparing the third image signal with a second value, and generating the second modified signal based on the comparison results. The second modified signal has a first correction constant when the first modified signal is less than the first value and the third image signal is larger than the second value. The second modified signal is equal to the first modified signal when the first modified signal is equal or larger than the first value, or the third image signal is equal or less than the second value. The second modified signal is equal to the sum of the first modified signal and a second correction constant when the first modified signal is less than the first value, or the third image signal is larger than the second value.

The first modified signal is equal or larger than the second image signal when the first image signal is less than the second image signal.

BRIEF DESCRIPTION OF THE DRAWINGS

The features of the present invention will become more apparent to those of ordinary skill in the art by describing in detail exemplary embodiments thereof with reference to the attached drawings, in which:

FIG. 15A is a cross-sectional view taken along the line XXIIIA-XXIIIA' of the TFT array panel of FIG. 14.

Use of the same reference symbols in different figures indicates similar or identical items.

DETAILED DESCRIPTION

Figure 1:
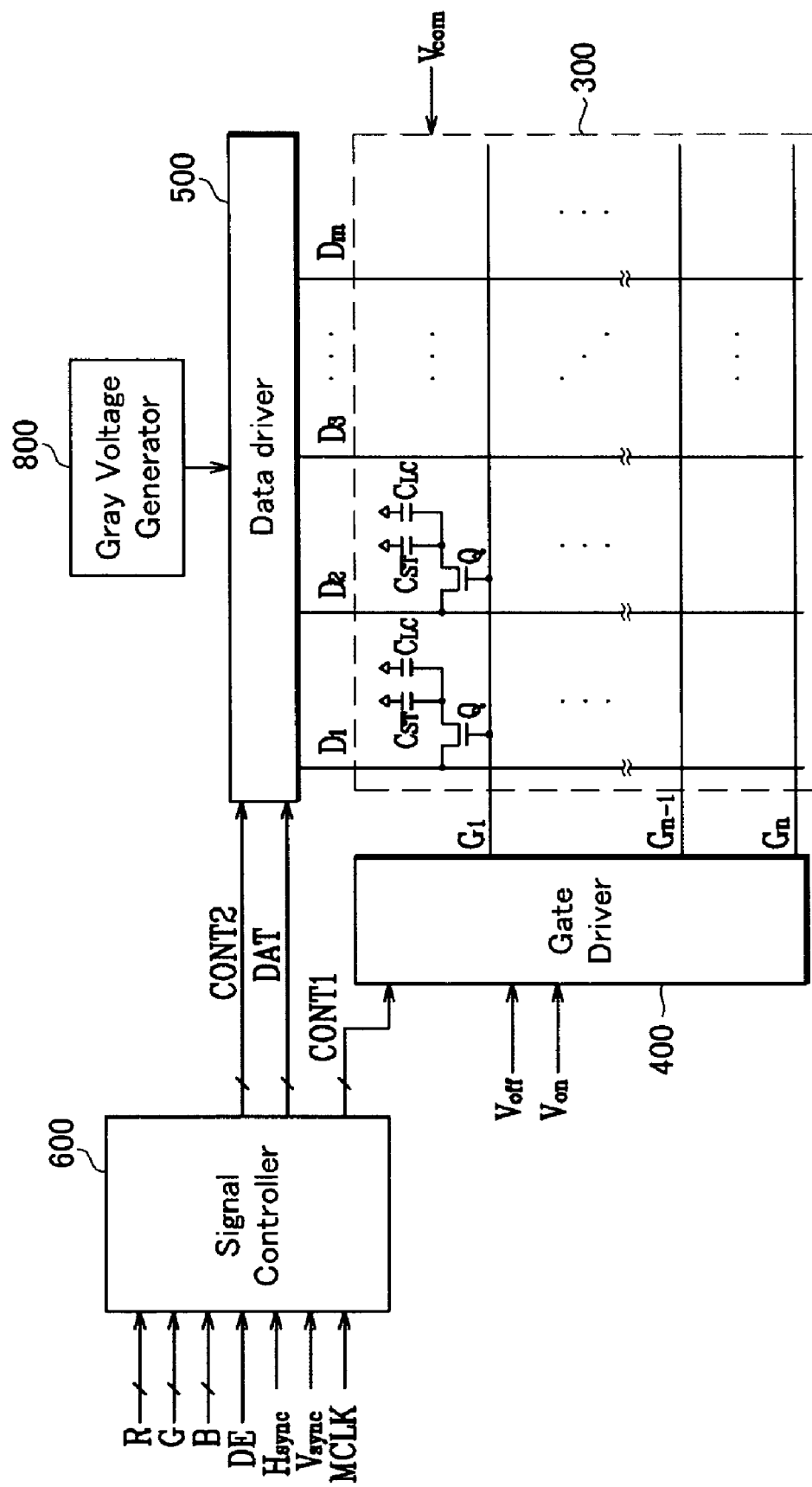
FIG. 1 is a block diagram of an LCD device according to an embodiment of the present invention.
Figure 2:
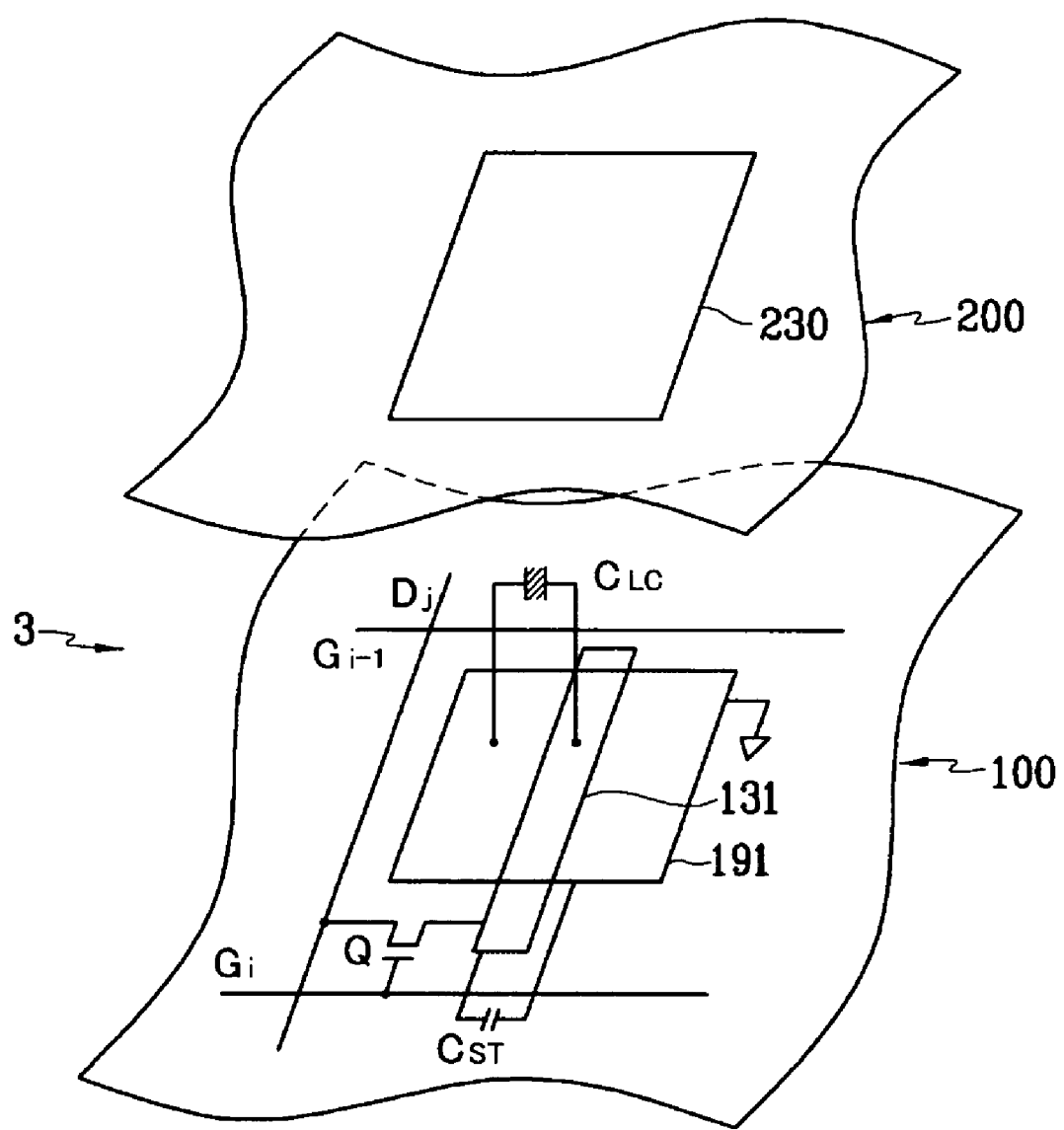
FIG. 2 is an equivalent circuit of a pixel of the LCD device of FIG. 1 according to an embodiment of the present invention.

FIG. 1 is a block diagram of an LCD device according to an embodiment of the present invention, and FIG. 2 is an equivalent circuit of a pixel which is formed in a liquid crystal panel assembly 300 of the LCD device shown in FIG. 1.

Referring to FIG. 1, a LCD device includes a liquid crystal panel assembly 300, a gate driver 400, a data driver 500, a gray voltage generator 800 connected to data driver 800, and a signal controller 600. Liquid crystal panel assembly 300 includes gate lines $G_1$-$G_n$, data lines $D_1$-$D_m$, and a plurality of pixel arranged in a matrix. As shown in FIG. 2, liquid crystal panel assembly 300 includes a first substrate 100, a second substrate 200, a liquid crystal layer 3 therebetween.

Gate lines $G_1$-$G_n$ carry gate signals and extend substantial parallel to one another, in a horizontal direction along rows of pixels. Data lines $D_1$-$D_m$ carry data signals and extend substantial parallel to one another, in a vertical direction along columns of pixels.

Each pixel includes a switch device Q, a liquid crystal capacitor $C_{LC}$, and a storage capacitor $C_{ST}$.

Switch device Q is a TFT formed on first substrate 100. A control terminal of the TFT and an input terminal is connected to an associated gate line $G_i$ and an an associated data line $D_j$ respectively. An output terminal of the TFT is connected to liquid crystal capacitor $C_{LC}$ and storage capacitor $C_{ST}$.

A pixel electrode 191 and a common electrode 131 formed on first substrate 100, and liquid crystal layer 3 between pixel electrode 191 and common electrode 131 form liquid crystal capacitor $C_{LC}$. Pixel electrode is connected to switch device Q and common electrode formed on whole first substrate 100 is provided with a common voltage $V_{com}$.

Pixel electrode 191 and common electrode 131 overlap to forms a storage capacitor $C_{ST}$ with an insulating layer therebetween as a dielectric layer.

Each pixel displays one of a set of primary color (space divided type), or displays alternately a set of primary color (time divided type) to realize desired images with mixing primary colors. An exemplary set of primary colors includes three primary colors: red, green, and blue. The display of images is obtained by the combination of the three primary colors.

As an example of space divided type, a color filter 230 representing one of primary color is formed on second substrate 200 corresponding to pixel electrode 191. In one embodiment, color filter 230 can be formed under or over pixel electrode 191 formed on first substrate 100.

At least one of polarizer (not shown) is provided on the outer surface of liquid crystal panel assembly 300.

Referring to FIG. 1, gray voltage generator 800 generates two set of gray voltages corresponding to luminance. One set has positive values to common voltage $V_{com}$, and another set has negative values to common voltage $V_{com}$. Gray voltages are provided to data driver as standard data voltages.

Gate driver 400 provides gate signals to gate lines $G_1$-$G_n$, where the gate signals are either Voff (a voltage sufficient to turn off the associated transistor) or Von (a voltage sufficient to turn on the associated transistor).

Data driver 500 provides to data lines $D_1$-$D_m$ data voltages, which are selected from the gray voltages generated by gray voltage generator 800. Data voltages are provided to pixel electrode 191 of FIG. 2 through switch device Q. The voltage difference of data voltage and common voltage $V_{com}$ is a pixel voltage (i.e. voltage charging liquid crystal capacitor $C_{LC}$).

The LC molecules between pixel electrode 191 and common electrode 131 are aligned variously depending on the pixel voltage to adjust polarization of incident light. The light polarization alteration changes light transmittance through the liquid crystal panel assembly with at least one of polarizer, thereby changing luminance of the liquid crystal panel assembly.

A pixel voltage (i.e. black voltage Vb) for displaying black color having lowest gray level and a pixel voltage (i.e. white voltage Vw) for displaying white color having highest gray level determine the lower and the upper limit of the data voltages. For a normally black LCD device, black voltage Vb is a minimum pixel voltage, and white voltage Vw is a maximum pixel voltage. If desired, maximum pixel voltage is larger than 6V.

In one embodiment of a normally black LCD device, when pixel voltages have a range of 0V to 7.3V for desired luminance, and common voltage $V_{com}$ is 0V, positive gray voltages have a range of 0V to 7.3V, and negative gray voltages have a range of −7.3V to 0V. For example, 8 bit image signal displays "0" gray level to "255" gray level. "0" gray level corresponds to 0V, and "255" gray level corresponds to 7.3V or −7.3V.

The range of pixel voltages and gray voltages can be adjusted depending on the characteristic of LCD device.

The following description is generalized for a normally black LCD device.

In some embodiments, gate driver 400 and/or data driver 500 are included in chips mounted directly on liquid crystal panel assembly 300, or on flexible printed circuit films. In some embodiments, gate driver 400 and/or data driver 500 can be integrated on liquid crystal panel assembly 300.

Signal controller 600 controls gate driver 400 and data driver 500.

Input image signals (e.g., R, G, and B signals), and input control signals, such as a vertical synchronization signal $V_{sync}$ to activate a frame, a horizontal synchronization signal $H_{sync}$ to activate a line, a main clock MCLK and a data enable signal DE from an external graphic controller (not shown), are provided to signal controller 600. Signal controller 600 generates gate control signals CONT1 and data control signals CONT2 by processing input control signals. Signal controller 600 also converts input image signals R, G, and B to image signal DAT suitable for display panel 300.

Gate control signals CONT1 include a scanning start signal to initiate scanning a gate-on voltage $V_{on}$ and at least one clock signal for controlling the output time of the gate-on voltage $V_{on}$. The gate control signals CONT1 may include a plurality of output enable signals for defining the duration of the gate-on voltage $V_{on}$.

The data control signals CONT2 include a horizontal synchronization start signal for initiating data transmission for a group of pixels Px, a load signal instructing data driver 500 to apply the data voltages to the data lines $D_1$-$D_m$, a inversion signal instructing a polarity of data voltage against the common voltage and a data clock signal.

Data driver 500 is provided with a set of image signals DAT for a row of pixels responsive to the data control signal CONT2. Data driver 500 converts the image signals DAT to data voltages by selecting gray voltages corresponding to the image signals DAT from gray voltage generator 800. Data voltages are applied to the associated data lines $D_1$-$D_m$.

Gate driver 400 provides the gate-on voltage $V_{on}$ to the associated gate lines $G_1$-$G_n$ responsive to the gate control signal CON1 from signal controller 600 to turn on the associated switch device Q connected to the gate lines $G_1$-$G_n$. Data voltages from data lines $D_1$-$D_m$ are provided to the associated pixel electrode through the switch device Q.

The orientation of LC molecules in the LC layer between the pixel electrode and the common electrode is adjusted depending on the voltage difference (i.e. pixel voltage) between the data voltage applied to the pixel electrode and the common voltage applied to the common electrode, thereby adjusting polarization of incident light. The polarized light changes the light transmittance through the polarizer on the surface of liquid crystal panel assembly 300, thereby the pixel displays the luminance (i.e. gray) corresponding to the image signals DAT.

By repeating this procedure for each row of pixels during horizontal periods 1H which means a period of a horizontal synchronization signal, all gate lines $G_1$-$G_n$ are sequentially supplied with the gate-on voltage $V_{on}$ during a frame to apply the data voltages to all of pixels.

During next frame, the polarity of the pixel is inversed to that of the previous frame.

A liquid crystal panel assembly according to an embodiment of the present invention will be described in detail with reference to FIGS. 3 to 4B.

Figure 3:
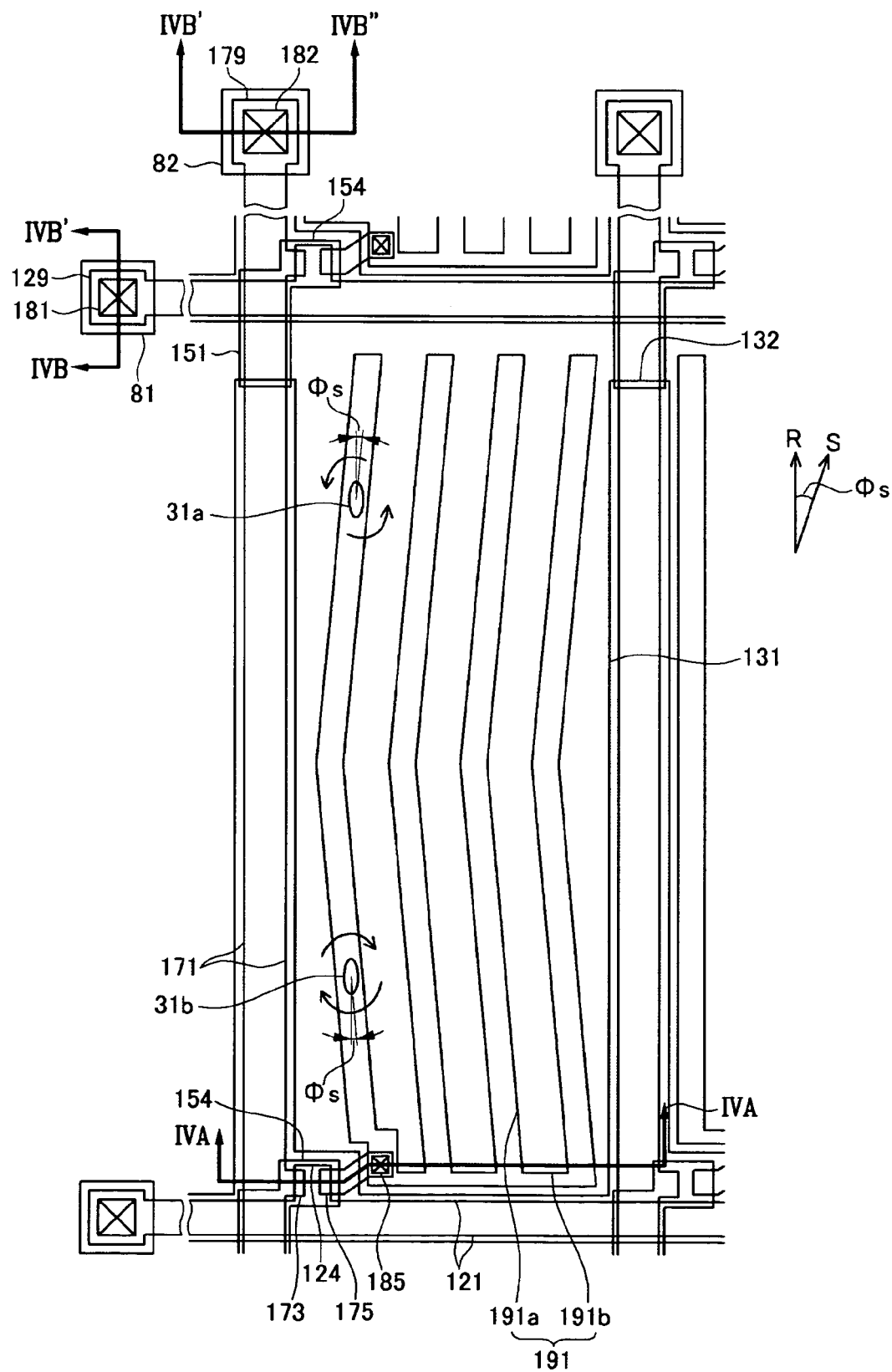
FIG. 3 is a plan view of a thin film transistor (TFT) array panel for an LCD device according to an embodiment of the present invention.
Figure 4A:
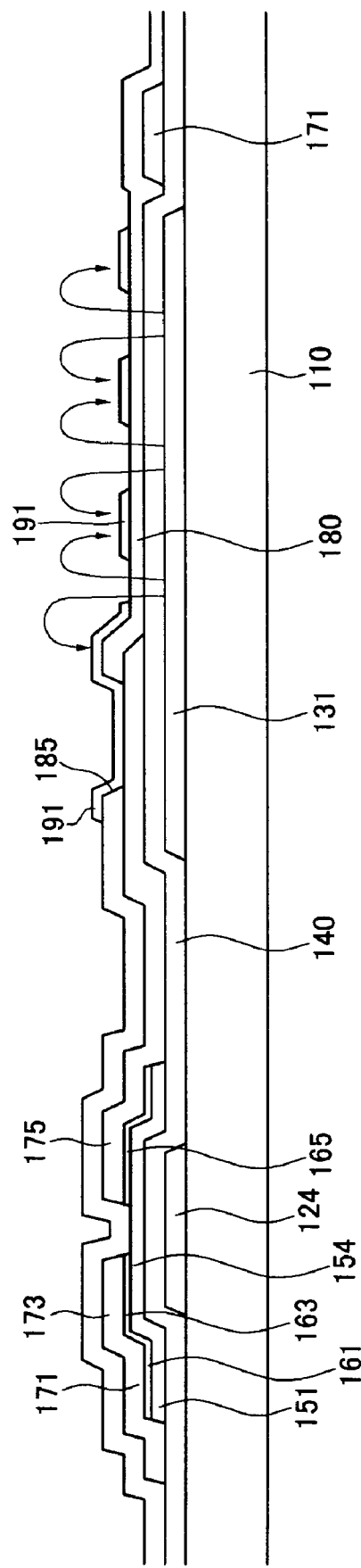
FIG. 4A is a cross-sectional view taken along the line IVA-IVA of the TFT array panel of FIG. 3.

FIG. 3 is a plan view of a TFT array panel for an LCD device. FIG. 4A is a cross-sectional view taken along the line IVA-IVA-IVA of FIG. 3. FIG. 4B is a cross-sectional view taken along the line IVB-IVB'-IVB" of FIG. 3.

A plurality of gate lines 121 and common electrodes 131 are formed on an insulating substrate 110, such as a transparent glass or a plastic.

Gate lines 121 carry gate signals and extend in a transverse direction. Gate electrodes 124 protrude from gate lines 121. Each gate line 121 includes an end portion 129 having a relatively large area for contact with an external device or an output of gate driving circuit (e.g., formed on substrate 110 or external).

Common electrode 131 is supplied with a common voltage. Common electrode 131 extends in a transverse direction and is disposed between gate lines 121. Common electrode 131 has longitudinal cutouts 132.

Gate line 121 can be formed of a metal such as Al, Ag, Cu, Mo, Cr, Ta, Ti, or alloys thereof. Gate lines 121 may have a multi-layered structure including two layers having different physical characteristics. Lower film may be made of low resistivity metal such as Al, Cu, Ag or alloys thereof for reducing signal delay or voltage drop in gate lines 121. Upper film may be made of a material such as Mo, Mo alloy (MoW alloy) or Cr, which have good physical, chemical, and electrical contact characteristics with other materials such as indium tin oxide (ITO) and indium zinc oxide (IZO). An exemplary combination of the lower film material and the upper film material is Cr and Al alloy, or Al alloy and Mo alloy, respectively. Gate lines 121 can be made of various metal or conductive materials.

Common electrode 131 can be formed of a transparent conductive material such as indium tin oxide (ITO) or indium zinc oxide (IZO).

The later sides of gate lines 121 and common electrodes 131 are inclined at angles in the range about 30 to about 80 degrees relative to the surface of substrate 110. A gate insulating layer 140 such as silicon nitride SiNx or silicon oxide SiOx is formed on gate lines 121 and common electrodes 131. Gate insulating layer 140 prevents a short circuit between gate lines 121 and common electrodes 131, and insulates gate lines 121 and common electrodes 131 from a upper conductive layer.

Semiconductors 151 such as hydrogenated amorphous silicon or polysilicon is formed on gate insulating layer 140. Each semiconductor 151 extends in a longitudinal direction and has a plurality of projections 154 protruding toward gate electrode 124.

A plurality of ohmic contact stripes 161 and ohmic contact islands 165 (e.g., made of silicide or n+ hydrogenated amorphous silicon highly doped with n type impurities such as phosphorous) are formed on semiconductors 151. Each ohmic contact stripe 161 has a plurality of protrusions 163. Protrusions 163 and ohmic contact islands 165 are disposed on projections 154 of semiconductor 151 and are spaced apart from each other with respect to gate electrodes 124. The lateral sides of semiconductors 151 and ohmic contacts 161 and 165 form a taper structure and are inclined at angles in the range about 30 to about 80 degrees relative to the surface of substrate 110.

A plurality of data lines 171 and drain electrodes 175 are formed on ohmic contacts 161 and 165. The data lines 171 transmit data signals and extend in a substantially longitudinal direction across gate line 121. Each data line 171 has a source electrode 173 branching toward drain electrode 175, with each data line 171 having an end portion 179 having a relatively large area for contact with other layers or external devices to receive a data signal from an external circuit.

Each pair of source electrodes 173 and drain electrodes 175 is separated from each other and facing each other with respect to a gate electrode 124 therebetween. A gate electrode 124, a source electrode 173, and a drain electrode 175, along with the semiconductor projection 154 form a TFT. A channel of the TFT is formed on the projection 154 between the source electrode 173 and the drain electrode 175.

Data lines 171 and drain electrodes 175 may be formed of a refractory metal such as Mo, Cr, Ta, Ti, and alloys thereof, and may have a single or a multi layered structure as described similarly for the gate line 121. In an exemplary embodiment, the data line 171 can have a multi layered structure including a lower layer of Cr, Mo, or alloys thereof and an upper layer of Al alloy, or a lower layer of Mo, an intermediate layer of Al, and an upper layer of Mo.

Semiconductor 151 has the same shape as the data line 171, the drain electrode 175, and the underlying ohmic contacts 161 and 165. However, the semiconductor 151 of semiconductor stripe 151 include some exposed portions, which are not covered with data lines 171 and drain electrodes 175, such as the portions located between source electrodes 173 and drain electrodes 175.

A passivation layer 180 is formed on the data lines 171 and the drain electrodes 175, exposed portion of semiconductor 151 and the gate insulating layer 140. Passivation layer 180 is made of an inorganic material such as silicon nitride and silicon oxide. In one embodiment, passivation layer 180 has a double-layered structure of a lower inorganic layer and an upper organic layer.

Passivation layer 180 has a plurality of contact holes 185 and 182 to expose at least a portion of the drain electrodes 175 and the end portions 179 of the data lines 171 respectively. Also, a plurality of contact holes 181 for exposing the end portion 129 of the gate line 121 are formed through the passivation layer 180 and the gate insulating layer 140.

A plurality of pixel electrodes 190 and the contact assistants 81 and 82, which may be made of IZO or ITO, are formed on passivation layer 180.

Pixel electrodes 191 include branch electrodes 191a and connection electrodes 191b. Branch electrodes 191a, extending in a longitudinal direction, have a bent shape and connection electrode 191b connects branch electrodes 191a. Branch electrodes 191a are inclined at an angle of $\Phi_S$ with respect to data lines 171. Branch electrodes 191a have bent portions at the center, resulting in upper branches and lower branches relative to a center portion between gate lines 121. Upper branches extend obliquely from an upper right side to a lower left side. Lower branches extend obliquely from an upper left side to a lower right side. Pixel electrode 191 overlaps with the associated common electrode 131.

The overlapping area between common electrode 131 and data lines 171 forms a parasitic capacitor to delay a data signal. To reduce this problem, a portion of overlapping area is removed and remaining portions connect neighboring common electrodes.

Pixel electrode 191 is connected physically and electrically to the drain electrode 175 through the contact hole 185 to receive a data voltage (i.e. data signal). Referring to FIG. 4A, pixel electrode 191 provided with the data voltage and common electrode 131 provided with a common voltage generate an electric field having a horizontal component and a vertical component relative to substrate 110 in LC layer(not shown) disposed between the pixel electrode 190 and the common electrode 131, thereby rotating and tilting LC molecules. The orientation of LC molecules adjusts a polarization of incident light. The pixel electrode 191 and the common electrode 131 form a liquid crystal capacitor $C_{LC}$, which stores applied voltages after turn-off of the TFT. A storage capacitor may be formed in parallel to the LC capacitor to enhance the capability of storing electrical charges. The storage capacitors are also implemented by overlapping pixel electrodes 191 and common electrode 131 along with passivation 180 and gate insulating layer 140 interposed between them.

The contact assistants 81 and 82 are connected to the end portions 129 and 179 of the gate lines 121 and the data lines 171, respectively, through the contact holes 181 and 182, respectively. The contact assistants 81 and 82 protect the end portions 129 and 179, and enhance adhesion of the end portions 129 and 179 with external devices. The contact assistants 81 and 82 are optional elements and can be connected to external devices through an anisotropic conductive film (not shown) or, if integrated at the TFT array panel 100, to the wire lines of a corresponding integrated gate driving circuit or a corresponding integrated data driving circuit.

The inner surfaces on the substrates 100 and 200 of FIG. 2 are coated with alignment films (not shown) which help LC molecules maintain an initial horizontal orientation. The coated alignment films are treated by rubbing process or UV irradiation to align LC molecules in a direction.

Referring to FIG. 3, according to an embodiment of the present invention, after alignment treatment such as rubbing process, longitudinal axis of LC molecule 31a disposed over the area corresponding to the upper branches of branch electrodes 191a is inclined at initial twist angle $\phi_S$ in a counter-clockwise direction. Longitudinal axis of LC molecule 31b disposed over the area corresponding to the lower branches of branch electrodes 191b is inclined at initial twist angle $\phi_S$ in a clockwise direction. LC molecule 31a rotates in a counter-clockwise direction, and LC molecule 31b rotates in a clockwise direction due to the initial twist angle $\phi_S$. Accordingly, two domains are caused to widen viewing angle.

The initial twist angle $\phi_S$ is an angle between the longitudinal axis of LC molecule and the branch electrode of the pixel electrode without applying the pixel voltage. In one embodiment, the initial twist angle $\phi_S$ is larger than 0 degree and less than or equal to 10 degree.

The initial angle affects an initial rotation force as the following equation (1).

$$N=2\Delta\in E\sin(2\phi S) \quad (1)$$

where $\Delta\in$ is a dielectric anisotropy of LC molecule, E is an electric field applied to LC molecule, and $\phi_S$ is an initial twist angle.

When the initial angle $\phi_S$ is 0 degree to reduce the initial rotation force, the response speed of LC molecules decreases. When the initial angle $\phi_S$ is larger than 10 degree, response speed of LC molecule increases, but effective retardation of light decreases to reduce the luminance of a LCD device.

Accordingly, an embodiment of the present invention reduces the maximum initial twist angle $\phi_S$ as like the above description to improve the luminance of LCD device and provides a driving method to increase a response speed of LC molecules.

Figure 5:
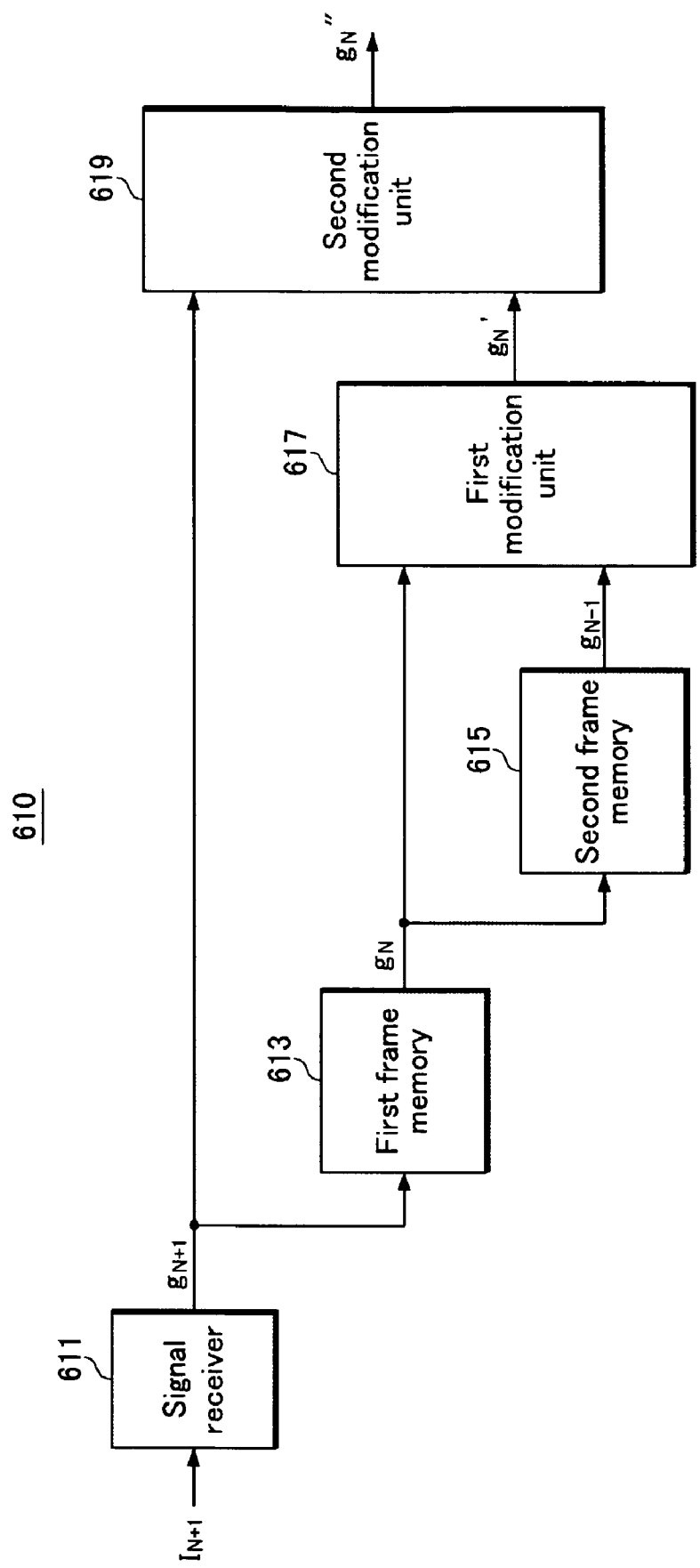
FIG. 5 is a block diagram of an image signal modification assembly according to an embodiment of the present invention.
Figure 6:
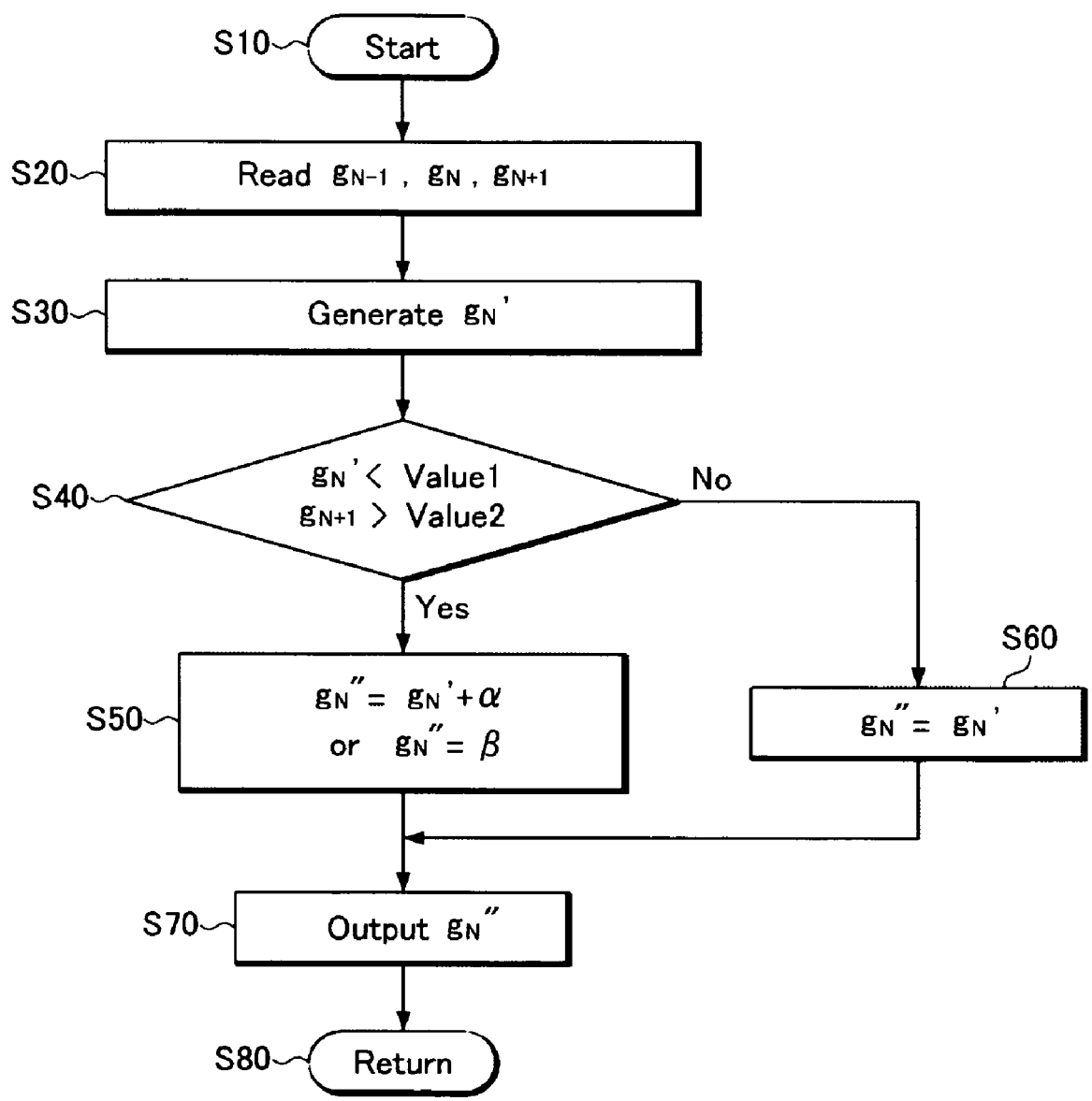
FIG. 6 is a flow chart illustrating an operation of the image signal modification assembly of FIG. 5.

Referring to FIGS. 5 and 6 a driving method according to an embodiment of the present invention will be described in detail.

FIG. 5 is a block diagram of an image signal modification assembly for a LCD device according to an embodiment of the present invention.

An image signal modification assembly 610 includes a signal receiver 611, a first frame memory 613, a second frame memory 615, a first modification unit 617, and a second modification unit 619. Image signal modification assembly 610 is formed in signal controller 600 or a portion of image signal modification assembly 610 is formed in signal controller 600.

Signal receiver 611 receives an input image signal $I_{N+1}$ for next frame from an external graphic controller such as input image signal R, G, and B of FIG. 1. Signal receiver 611 converts the input image signal $I_{N+1}$ into an image signal $g_{N+1}$ which has a processable form in image signal modification assembly. The image signal $g_{N+1}$ is provided to first frame memory 613 and second modification unit 619.

First frame memory 613 is connected to signal receiver 611. First frame memory 613 outputs a stored present image signal $g_N$ (i.e. image signal for nth frame) to second frame memory 615, and receives a next image signal $g_{N+1}$ (i.e. image signal for (n+1)th frame) from signal receiver 611. The next image signal $g_{N+1}$ is stored in first frame memory 613.

Second frame memory 615 is connected to first frame memory 613. Second frame memory 615 outputs a stored previous image signal $g_{N-1}$ (i.e. image signal for (n-1)th frame) to first modification unit 617, and receives the present image signal $g_N$ from first frame memory 613. The present image signal $g_N$ is stored in second frame memory 615.

In another embodiment, one frame memory can output a stored previous image signal $g_{N-1}$ and a present image signal $g_N$ to first modification unit 617, and receives and stores a next image signal $g_{N+1}$ from signal receiver 611.

First modification unit 615 is connected to first frame memory 613 and second frame memory 615. First modification 615 receives the present image signal $g_N$ from first frame memory 613 and the previous image signal $g_{N-1}$ from second frame memory 615. First modification 615 modifies the present image signal $g_N$ based on the previous image signal $g_{N-1}$ and outputs a first modified signal $g_N'$ to second modification unit 619.

Second modification unit 619 is connected to signal receiver 611 and first modification unit 619. Second modification unit 619 receives the next image signal $g_{N+1}$ from signal receiver and first modified signal $g_N'$ from first modification unit 617. Second modification unit 619 modifies first modified signal $g_N'$ based on the next image signal $g_{N+1}$ to generate and output a second modified signal $g_N''$ to data driver 500 of FIG. 1.

FIG. 6 is a flow chart for illustrating an operation of first modification unit 617 and second modification unit 619 of FIG. 5.

At S10, first modification unit 617 starts to operate.

At S20, first modification unit 617 reads the previous image signal $g_{N-1}$ and the present image signal $g_N$. Second modification unit 619 reads the next image signal $g_{N+1}$.

At S30, first modification unit 617 recognizes and classifies a pair of the previous image signal $g_{N-1}$ and the present image signal $g_N$, and extracts a standard data for modification from a look-up-table (not shown) corresponding to the pair. First modification unit 617 processes the extracted standard data to generate first modification signal $g_N'$. The standard data for modification can be adjusted through an experiment. According to an embodiment of the present invention, when the previous image signal $g_{N-1}$ is less than the present image signal $g_N$, first modified signal $g_N'$ is determined to have a larger value than the present image signal $g_N$. When the difference between the previous image signal $g_{N-1}$ and the present image signal $g_N$ is within a determined range, first modified signal $g_N'$ has a equal value to the present image signal $g_N$. However, when the present image signal $g_N$ has a maximum gray level (i.e. white gray), for example, when the present image signal $g_N$ with 8 bit signal is "255" gray level (i.e. maximum gray for 8 bit image signal), the standard data for modification is determined so that first modified signal $g_N'$ has a "255" gray level.

At S40, Second modification unit 619 compares first modified signal $g_N'$ with a first value (value 1), and then compares next image signal $g_{N+1}$ with a second value (value2). The value 1 and the value 2 are constant as a standard value.

At S50, as a result of comparison at S40, when first modified signal $g_N'$ is less than the value 1 and next image signal $g_{N+1}$ is larger than the value 2, first modified signal $g_N'$ is added with a correction value α to generate second modified signal $g_N''$. Otherwise, second modified signal $g_N''$ has a constant β irrespective of first modified value $g_N'$. The correction value α can be determined depending to first modified signal $g_N'$ and next image signal $g_{N+1}$.

Meanwhile, at S60, as a result comparison at S40, when first modified signal $g_N'$ is larger than the value 1, or next image signal $g_{N+1}$ is less than the value 2, second modified signal $g_N"$ has an equal value to first modified signal $g_N'$ (S60).

After outputting second modified signal $g_N"$ at S70, the above procedures are repeated for a next frame.

Figure 7:
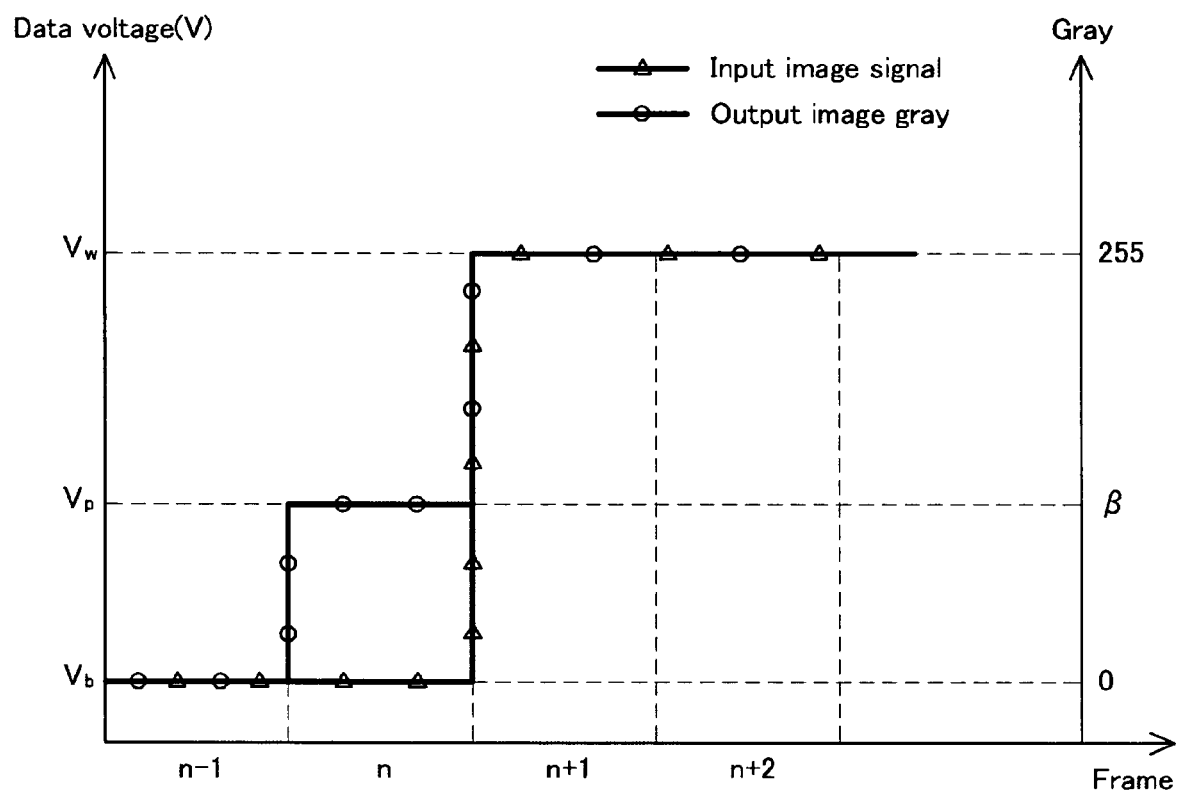
FIG. 7 is a modified image signal according to an embodiment of the present invention.
Figure 8:
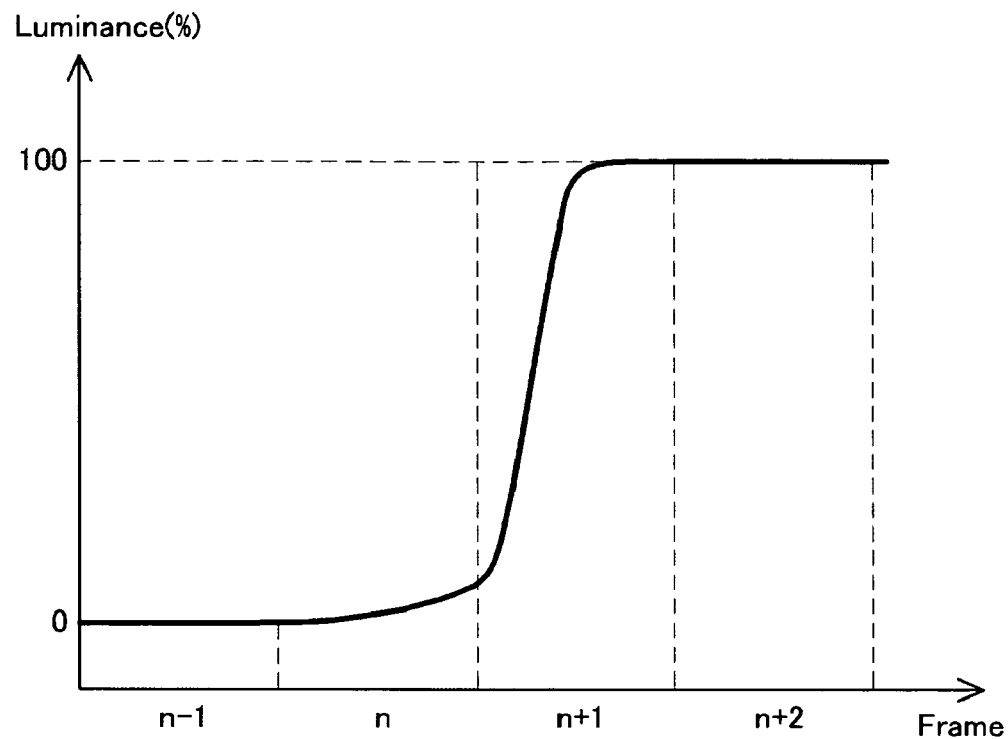
FIG. 8 shows luminance corresponding to the modified image signal of FIG. 7.

FIG. 7 is a modified signal generated according to an embodiment of the present invention, and FIG. 8 shows luminance corresponding to the modified signal.

Referring to FIG. 7, an image signal for (n−1)th frame and an image signal for nth frame has "0" gray level. An image signal for (n+1)th and (n+2)th frame has "255" gray level which is a maximum gray (white gray). A data voltage corresponding to gray level is represented in an absolute value.

The first modified signal for nth frame has a "0" gray level because there is no difference between gray levels of (n−1)th frame and nth frame.

The first modified signal for (n+2)th frame has a "255" gray level because the gray levels of (n+1)th frame is maximum gray. The first modified signal for (n+1)th frame has "255" gray level because the gray for (n+1)th frame has a maximum gray level.

In this embodiment, the value 1 is set up as "40" gray level, and the value 2 is set up as "210" gray level. At S50, the second modified signal is constant value β and β is equal to "91" gray level. The second modified signal for nth frame has a "91", and the second modified signal for (n+1)th frame is equal to the level of the first modified signal. If a range of gray voltage is from 0.0 V to 7.3 V, a data voltage adapted to be applied to a associated pixel electrode for (n−1)th frame is a minimum voltage 0.0V (i.e. black voltage Vb). A data voltage for nth frame is 2.6V (Vp) and a data voltage for (n+1)th frame is a maximum voltage 7.3V (i.e. white voltage Vw). Even though a gray level for nth frame is "0", the data voltage 2.6V for nth frame is applied to the pixel electrode through the operation of the image signal modification assembly, thereby pre-rotating LC molecules in nth frame for (n+1)th frame with a white gray to improve the response speed of LC molecules in (n+1)th frame. Accordingly, a target luminance (i.e. white gray) is achieved rapidly in (n+1)th frame as shown in FIG. 8.

According to the embodiment of the present invention, a pre-tilting voltage in nth frame is provided to a pixel electrode to increase a response speed for (n+1)th frame without increasing initial twist angle $\phi_S$ of FIG. 3. Also, limitation of initial twist angle $\phi_S$ of FIG. 3 reduce a loss of luminance of LCD device.

Figure 9:
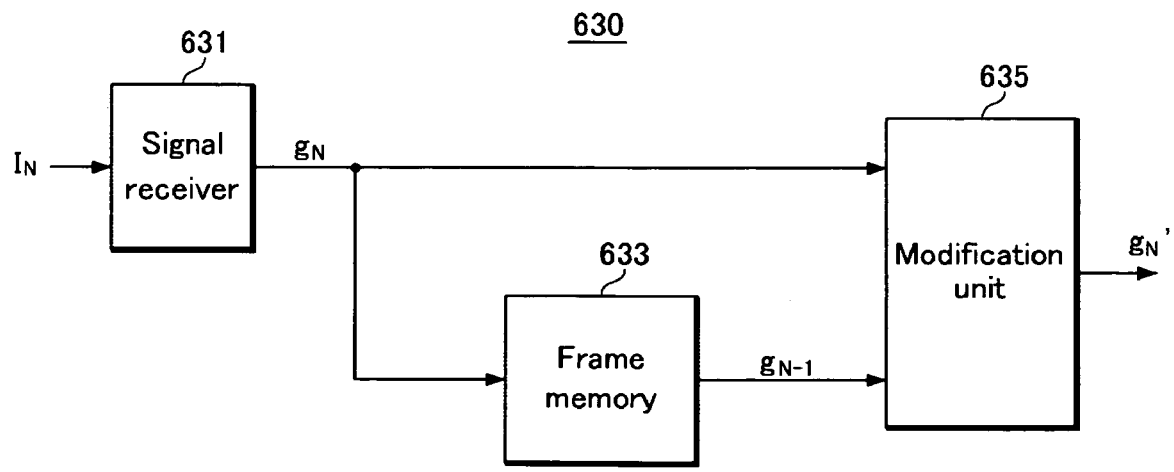
FIG. 9 is a block diagram of an image signal modification part according to another embodiment.

FIG. 9 is a block diagram of an image signal modification assembly according to another embodiment of the present invention.

An image signal modification assembly 630 includes a signal receiver 631, a frame memory 633 connected to signal receiver 631, and a modification unit 635 connected to signal receiver 631 and frame memory 633. Signal controller 600 of FIG. 1 can include a whole of image signal modification assembly 630 or a portion of image signal modification assembly 630.

Signal receiver 631 receives an input image signal $I_N$ for a present frame from an external graphic controller, and converts the input image signal $I_N$ into a present image signal $g_N$ (i.e. image signal for nth frame) which can be processed in image signal modification assembly. The image signal $g_N$ is provided to frame memory 633 and modification unit 635.

Frame memory 633 outputs a stored previous image signal $g_{N−1}$ (i.e. image signal for (n−1)th frame) to modification unit 635. Frame memory 633 receives the present image signal $g_N$ from signal receiver 631 and stores the present image signal $g_N$.

Modification unit 635 receives the present image signal $g_N$ from signal receiver 631 and the previous image signal $g_{N−1}$ from frame memory 633. Modification unit 635 modifies the present image signal $g_N$ based on the previous image signal $g_{N−1}$ to generate a modified image signal $g_N'$. Modified image signal $g_N'$ outputs to data driver 500 of FIG. 1.

Figure 10:
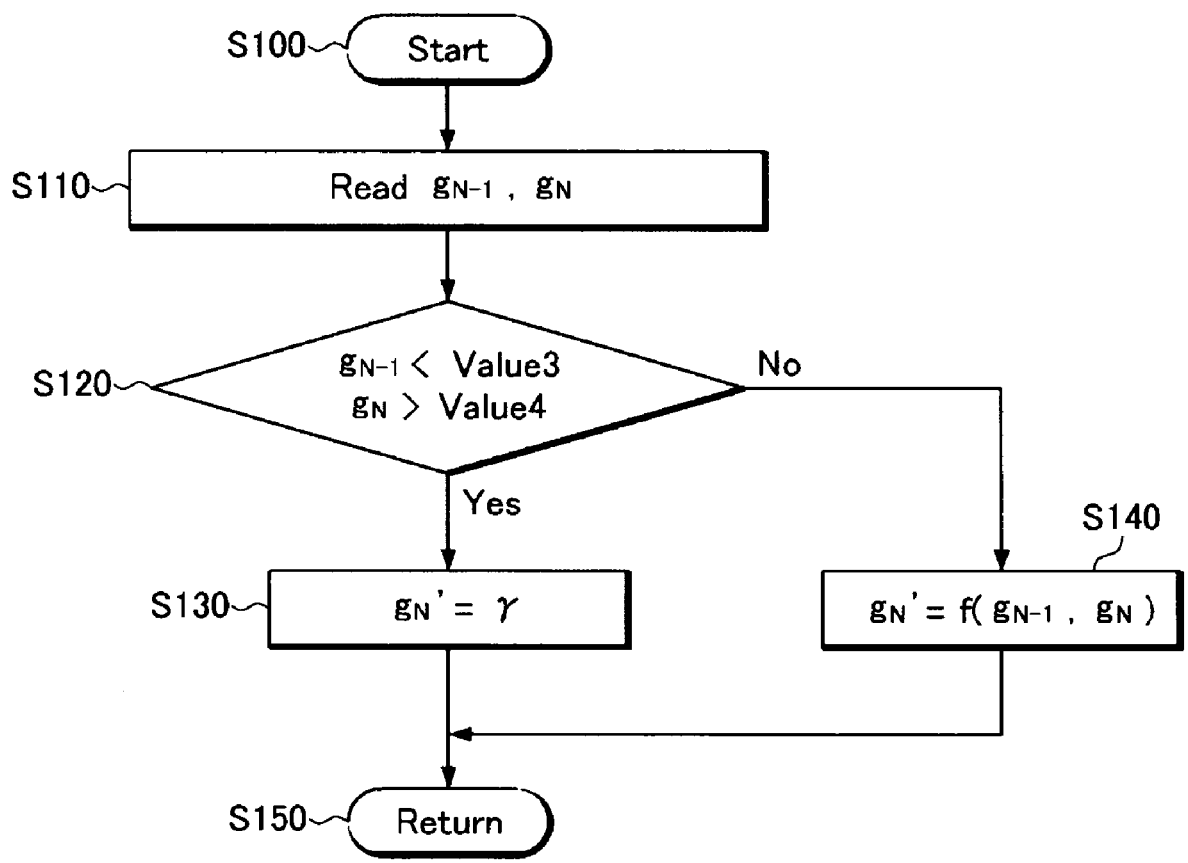
FIG. 10 is a flow chart illustrating an operation of the image signal modification part of FIG. 9.

FIG. 10 is a flow chart for illustrating an operation of modification unit 635 of FIG. 9.

At S100, modification unit 635 starts to operate. At S110, modification unit 635 receives and reads the previous image signal $g_{N−1}$ from frame memory 633 and the present image signal $g_N$ from signal receiver 631. At S120, modification unit 635 compares the previous image signal $g_{N−1}$ with a third value (value 3) and the present image signal $g_N$ with a fourth value (value 4). The value 3 and the value 4 are constant as a standard value.

At S130, as a result of comparison at S120, when the previous image signal $g_{N−1}$ is less than the value 3, and the present image signal $g_N$ is larger than the value 4, a modified image signal $g_N'$ with a constant γ is generated.

Meanwhile, at S140, as a result comparison at S120, when the previous image signal $g_{N−1}$ is larger than the value 3, or the present image signal $g_N$ is less than the value 4, a modified image signal $g_N'$ is generated depending on the previous image signal $g_{N−1}$ and the present image signal $g_N$ according to the same method of generating the first modified image signal of FIG. 7.

Figure 11:
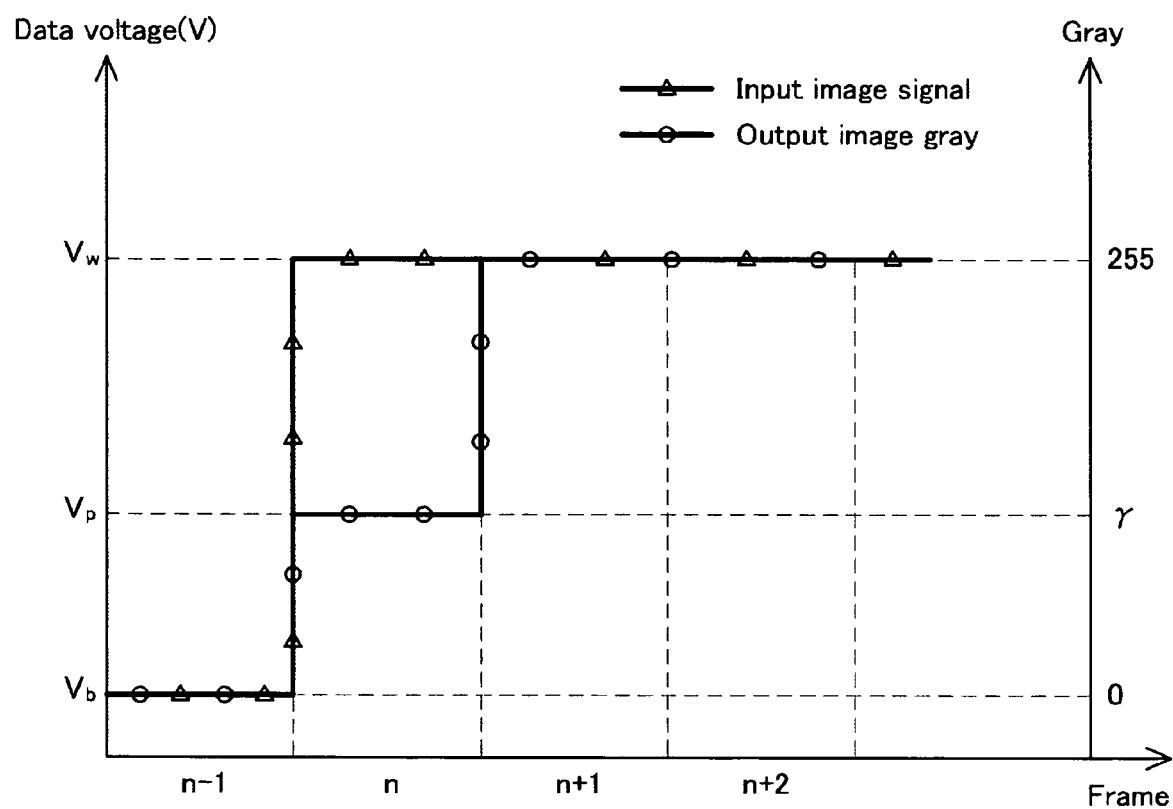
FIG. 11 shows a modified image signal according to another embodiment of the present invention.

At S150, after outputting modified signal gN', the above procedures are repeated for a next frame. FIG. 11 shows a modified signal generated according to an embodiment of the present invention.

Referring to FIG. 11, an image signal for (n−1)th frame has "0" gray (i.e. black gray), an image signal for nth frame has "255" gray (i.e. white gray) and an image signal for nth frame has "255" gray. A data voltage corresponding to gray level is represented in an absolute value in this embodiment.

In this embodiment, the value 3 is set up as "40" gray level, and the value 4 is set up as "210" gray level. At S130, the constant value γ as modified image signal $g_N'$ has "91" gray level. The modified signal for nth frame has "91" gray level, and the modified signal for (n+1)th frame has "255" gray level. If a range of gray voltage is from 0.0V to 7.3 V, a data voltage adapted to be applied to a associated pixel electrode for (n−1)th frame is a minimum voltage 0.0V (i.e. black voltage Vb). A data voltage for nth frame is 2.6V (Vp) and a data voltage for (n+1)th frame is a maximum voltage 7.3V (i.e. white voltage Vw).

According to this embodiment of the present invention, when a black gray in nth frame changes into a white gray in (n+1)th frame, the data voltage 2.6V for nth frame is applied to the pixel electrode to pre-rotate LC molecules in nth frame to improve the response speed of LC molecules in (n+1)th frame without an overshoot voltage for (n+1)th frame. Also, a maximum gray voltage is used as a white gray voltage to reduce a loss of gray.

Also, using a frame memory instead of two frame memories results in reduce a manufacturing cost according to this embodiment of the present invention.

Figure 12:
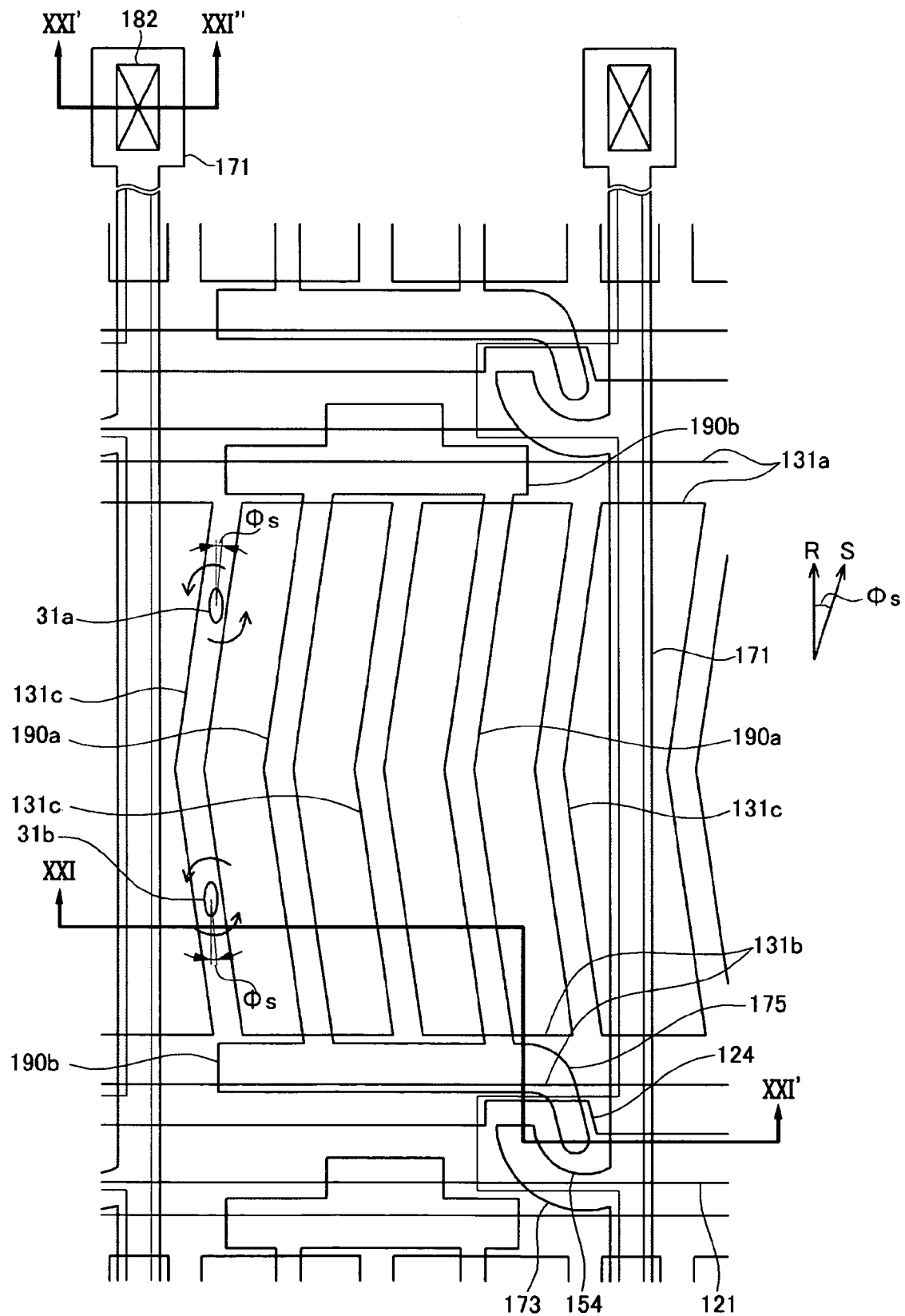
FIG. 12 is a plan view of a TFT array panel for a LCD device according to another embodiment of the present invention.
Figure 13:
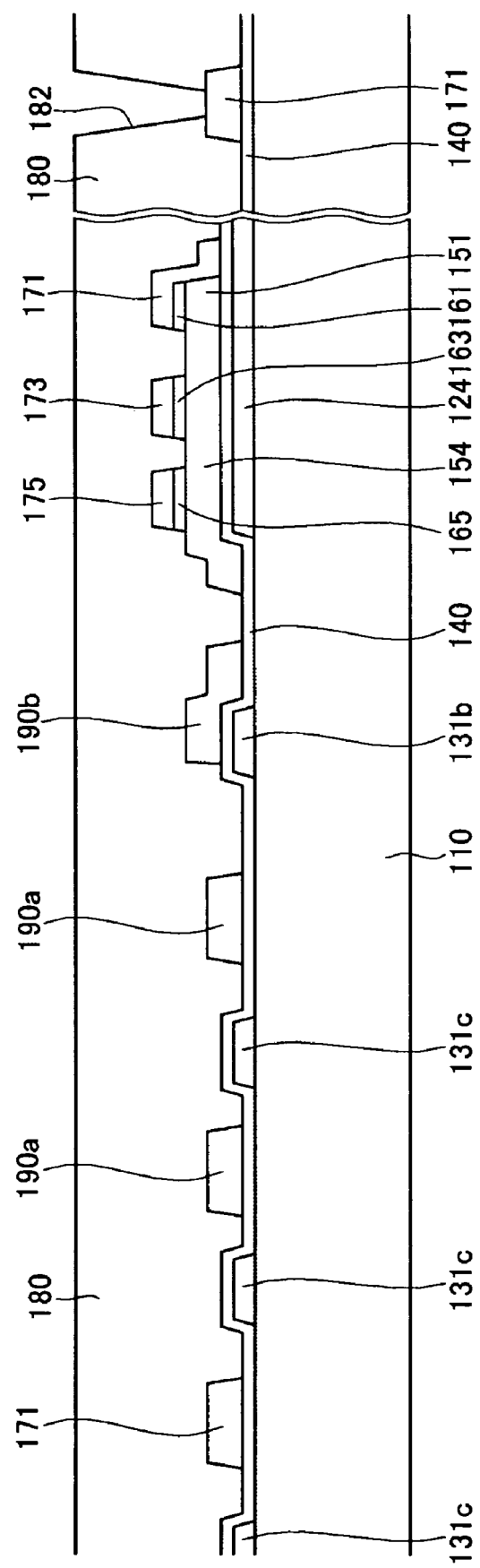
FIG. 13 is a cross-sectional view taken along the line XXI-XXI'-XXI" of the TFT array panel of FIG. 12.

FIG. 12 is a plan view of a TFT array panel for an LCD device according to another embodiment of the present invention. FIG. 13 is a cross-sectional view taken along the line XXI-XXI'-XXI" of FIG. 12.

Referring to FIGS. 12 and 13, a plurality of gate lines 121 and common electrode lines 131a and 131b are formed on an insulating substrate 110, such as a transparent glass or a plastic.

Gate line 121 carries gate signal and extends in a transverse direction. Gate electrode 124 protrudes from gate line 121. Gate line 121 can include an end portion (not shown) having a relatively large area for contact with an external device or an output of gate driving circuit (e.g., formed on substrate 110 or external).

Common electrode lines 131a and 131b is supplied with a common voltage. Common electrode lines 131a and 131b are located between gate lines 121. Common electrode lines 131a and 131b are adjacent gate lines 121 and extend in parallel with gate lines 121. Common electrode lines 131a and 131b includes a plurality of common electrodes 131c. Common electrodes 131c extend obliquely from common electrode lines 131a and 131b to connect common electrode lines 131a and 131b.

Common electrodes 131c are inclined at an angle of $\phi_S$ with respect to data lines 171. Common electrodes 131c have upper branches and lower branches relative to center portion between gate lines 121. Upper branches extend obliquely from an upper right side to a lower left side. Lower branches extend obliquely from an upper left side to a lower right side.

Gate lines 121, common electrode lines 131a and 131b, and common electrodes 131c are formed in a same layer. Gate lines 121, common electrode lines 131a and 131b, and common electrodes 131c are formed of Al or Al alloys. Gate lines 121, common electrode lines 131a and 131b, and common electrodes 131c may have a multi-layered structure including Cr, Ti, Ta, Mo, or alloys thereof as an upper layer on a lower layer of Al or Al alloys. For example, the double-layered structure has an upper Cr and a lower AlNd. For a three-layered structure, a conductive layer containing Al is uses as an intermediate layer.

The lateral sides of gate lines 121, common electrode lines 131a and 131b, and common electrode 131c are tapered so that subsequent layers to be deposited will conform, without a break, to the underlying structure.

A gate insulating layer 140 such as silicon nitride SiNx or silicon oxide SiOx is formed on gate lines 121, common electrodes lines 131a and 131b, and common electrodes 131c.

Semiconductors 151 such as hydrogenated amorphous silicon or polysilicon is formed on gate insulating layer 140. Semiconductor 151 extends in a longitudinal direction and has a plurality of projections 154 protruding toward gate electrode 124.

A plurality of ohmic contact stripes 161 and ohmic contact islands 165 (e.g., made of silicide or n+ hydrogenated amorphous silicon highly doped with n type impurities such as phosphorous) are formed on semiconductor 151. Each ohmic contact stripe 161 has a plurality of protrusions 163. Protrusions 163 and ohmic contact islands 165 are disposed on projections 154 of semiconductor 151 and are spaced apart from each other with respect to gate electrodes 124. The lateral sides of semiconductors 151 and ohmic contacts 161 and 165 form a taper structure relative to the surface of substrate 110.

A plurality of data lines 171 and a plurality of pixel electrodes 190a and 190b are formed on ohmic contacts 161 and 165.

The data lines 171 carry data signals and extend in a substantially longitudinal direction across gate lines 121 and common electrode lines 131a and 131b. Each data line 171 has a "U" shape of source electrode 173 branching toward gate electrode 124, with each data line 171 having an end portion (not shown) having a relatively large area for contact with other layers or external devices to receive a data signal from an external circuit.

Pixel electrodes 190a and 190b are formed in a pixel area defined by gate lines 121 and data lines 171 and ohmic contact island 165. Pixel electrodes 190a and 190b includes transverse parts 190a and longitudinal parts 190b. Transverse part 190a extends in parallel with an adjacent gate line 121, and longitudinal parts 190b extend at an angle $\phi_S$ relative to data lines 171. A portion of transverse parts 190a can overlap gate lines 121. Longitudinal parts 190b connect transverse parts 190a, and are disposed alternately and in parallel with common electrodes 131c. Longitudinal parts 190b have upper longitudinal parts and lower longitudinal parts relative to center portion between gate lines 121. Upper longitudinal parts extend obliquely from an upper right side to a lower left side. Lower longitudinal parts extend obliquely from an upper left side to a lower right side.

A portion of transverse parts 190b extends toward semiconductor projections 154 to form a drain electrode 175. Each pair of source electrodes 173 and drain electrodes 175 is separated from each other and facing each other with respect to a gate electrode 124 therebetween. A gate electrode 124, a source electrode 173, and a drain electrode 175, along with the semiconductor projection 154 form a TFT. A channel of the TFT is formed on the projection 154 between the source electrode 173 and the drain electrode 175.

Semiconductor 151 has the same shape as the data line 171, the drain electrode 175, and the underlying ohmic contacts 161 and 165. However, the projections 154 of semiconductor 151 include some exposed portions, which are not covered with data lines 171 and drain electrodes 175, such as the portions located between source electrodes 173 and drain electrodes 175. Thus, while the ohmic contacts 161 and 165 have the same shape as the data line 171 and the drain electrode 175, the semiconductor 151 is exposed between the source electrode 173 and the drain electrode 175.

Data line 171 and source electrode 173 may be formed of indium zinc oxynitride (IZON), indium tine oxynitride (ITON), a double-layered structure having a lower film such as ITO and IZO and a upper film such as IZON and ITON.

Pixel electrodes 190a and 190b can be formed of the same layer as data lines 171 and source electrodes 173.

A passivation layer 180 is formed on the data lines 171, the pixel electrodes 190a and 190b, and gate insulating layer 140. Passivation layer 180 is made of an inorganic material such as silicon nitride and silicon oxide. In one embodiment, passivation layer 180 may be formed of a photosensitive material having sufficient flatness characteristics or a low dielectric material such as a-Si:C:O and a-Si:O:F.

The passivation layer 180 has a plurality of contact holes 182 to expose at the end portions of the data lines 171. Also, a plurality of contact holes (not shown) for exposing the end portion of the gate line 121 are formed through the passivation layer 180 and the gate insulating layer 140.

Referring to FIG. 12, longitudinal axis of LC molecule 31a disposed over the area corresponding to the upper longitudinal part of pixel electrodes 190a is inclined at initial twist angle $\phi_S$ in a count-clockwise direction. Longitudinal axis of LC molecule 31b disposed over the area corresponding to the lower longitudinal part of pixel electrodes 190b is inclined at initial twist angle $\phi_S$ in a clockwise direction. LC molecule 31a rotates in a count-clockwise direction, and LC molecule 31b rotates in a clockwise direction due to the initial twist angle $\phi_S$. Accordingly, two domains are caused to widen viewing angel.

Also, the initial twist angle $\phi_S$ is an angle between a rubbing direction R and a longitudinal axis S of the upper longitudinal part or the lower longitudinal part of the pixel electrodes 190a and 190*b* without applying a pixel voltage. In one embodiment, the initial twist angle $\phi_S$ is larger than 0 degree and 10 degree or less.

When the initial angle $\phi_S$ is 0 degree to reduce the initial rotation force, the response speed of LC molecules decreases. When the initial angle $\phi_S$ is larger than 10 degree, response speed of LC molecule increases, but effective retardation of light decreases to reduce the luminance of a LCD device.

Accordingly, an embodiment of the present invention reduces the maximum initial twist angle $\phi_S$ to improve the luminance of LCD device and provides the driving method as the above to increase a response speed of LC molecules.

Figure 14:
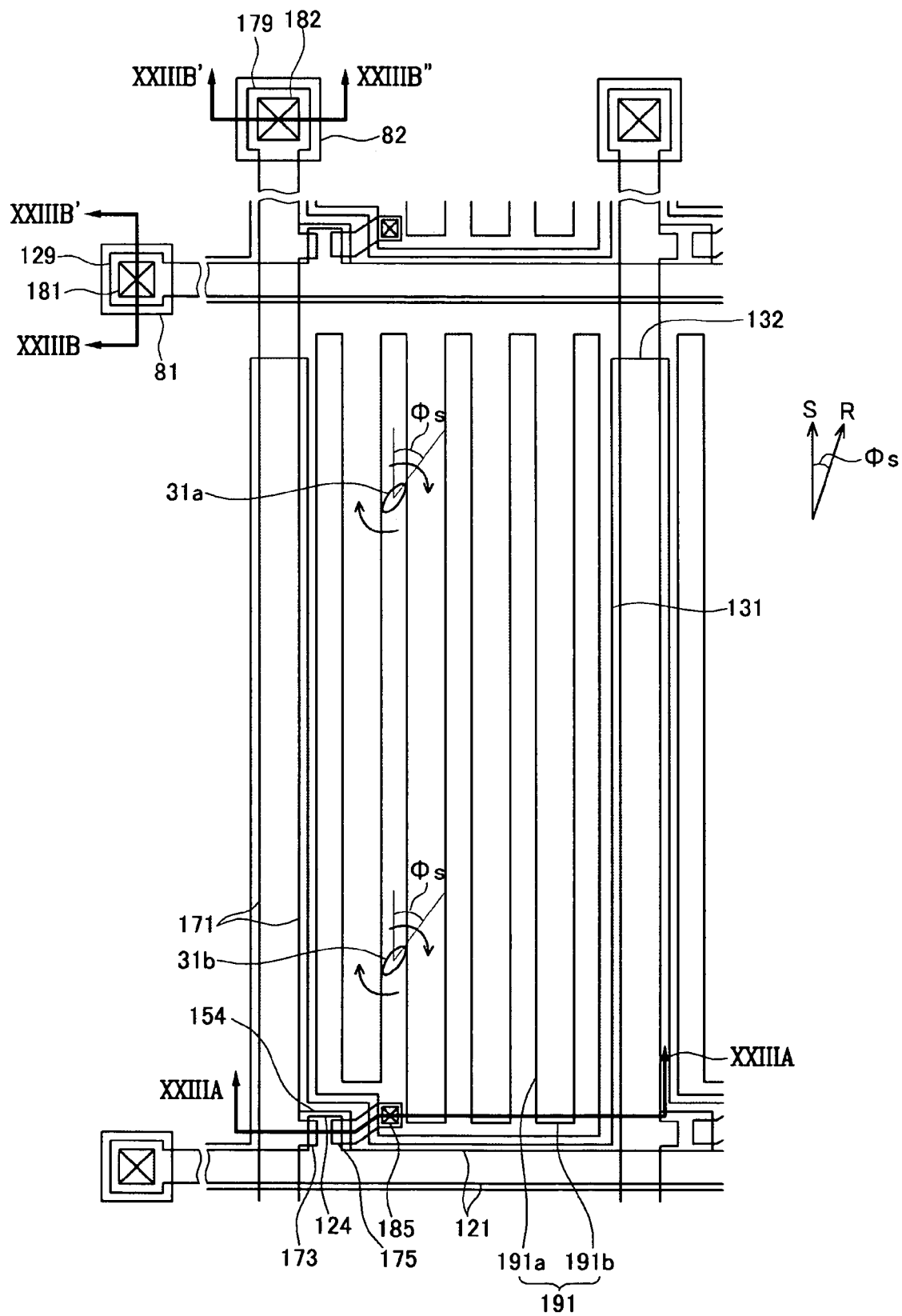
FIG. 14 is a plan view of a TFT array panel for a LCD device according to another embodiment of the present invention.
Figure 15B:
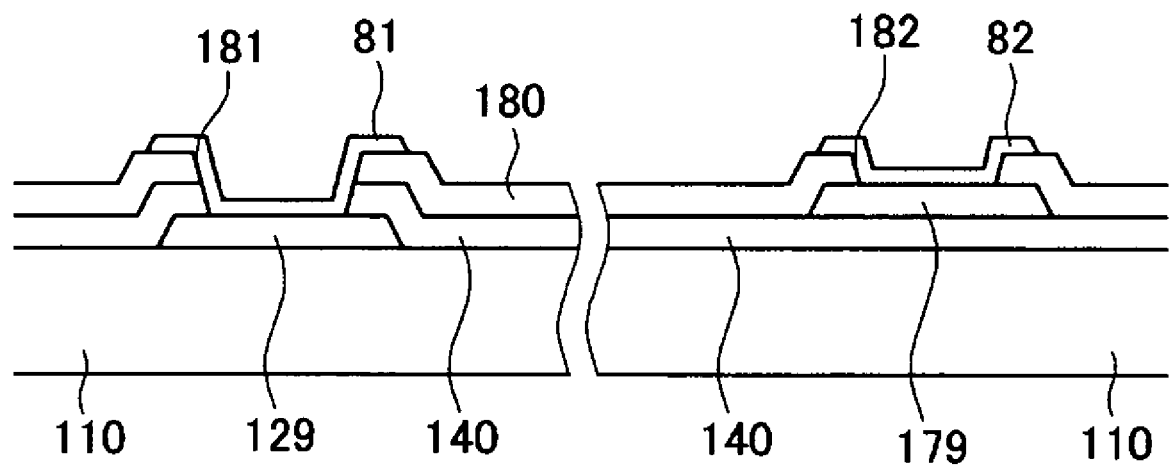
FIG. 15B is a cross-sectional view taken along the line XXIIIB-XXIIIB'-XXIIIB" of the TFT array panel of FIG. 14.

FIG. 14 is a plan view of a TFT array panel for a LCD device according to another embodiment of the present invention. FIGS. 15A to 15B are cross-sectional views taken along the line XXIIIA-XXIIIA and XXIIIB-XXIIIB' respectively.

Figure 4B:
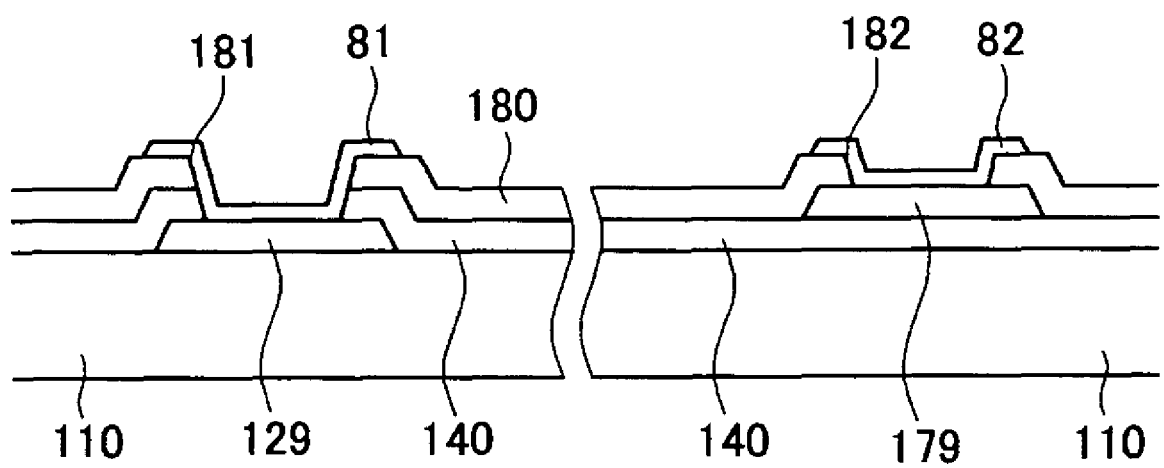
FIG. 4B is a cross-sectional view taken along the line IVB-IVB'-IVB" of the TFT array panel of FIG. 3.

The TFT array panel according to this embodiment is similar to the TFT array panel as shown in FIGS. 3 to 4B except a shape of a semiconductor 151 and a shape of a pixel electrode 191. Accordingly, duplicated explanation is not required.

Semiconductor 151 has substantially the same shape as a data line 171. A portion of semiconductor 151 is exposed between a source electrode 173 and a drain electrode to form a channel.

Branch electrodes 191*a* of pixel electrode 191 extends in parallel with data lines 171. A rubbing direction R is inclined at an angle $\phi_S$ with a longitudinal axis S of branch electrodes 191*a*. LC molecules 31*a* and 31*b* is aligned along the rubbing direction R to form an initial twist angle $\phi_S$ with the longitudinal direction S of branch electrodes 191*a*. In one embodiment, the initial twist angle $\phi_S$ is larger than 0 degree and 10 degree or less.

Accordingly, the embodiments of the present invention improve luminance and a response speed of a LCD device using IPS mode or FFS mode.

Although the invention has been described with reference to particular embodiments, the description is an example of the invention's application and should not be taken as a limitation. Various adaptations and combinations of the features of the embodiments disclosed are within the scope of the invention as defined by the following claims.

What is claimed is:

1. A liquid crystal display device comprising:
   a first substrate;
   a second substrate facing the first substrate;
   a liquid crystal layer interposed between the first substrate and the second substrate;
   a pixel electrode formed over the first substrate;
   a common electrode formed over the first substrate with insulating from the pixel electrode, wherein a portion of the common electrode overlaps with the pixel electrode;
   a gray voltage generator generating a plurality of gray voltages;
   an image signal modification assembly configured to receive a first image signal, a second image signal, and a third image signal for subsequent three frames and modify the second image signal based on the first image signal and the third image signal; and,
   a data driver configured to provide a data voltage selected from the plurality of gray voltages to the pixel electrode corresponding to the modified signal in the image signal modification assembly;
   wherein a longitudinal axis of the liquid crystal molecule is inclined at an angle with respect to a longitudinal axis of the pixel electrode and the image signal modification assembly generates an initial modified image signal based on the first image signal and the second image signal, and then modifies the second image signal based on the initial modified image signal and the third image signal and generates a second modified signal, and
   a maximum value of the second modified signal is equal to a maximum of the first image signal, the second image signal, and the third image signal, and the maximum value of the second modified signal is disposed between a block voltage of the lowest gray and a white voltage of the highest gray.

2. The liquid crystal display device of claim 1, wherein the angle is larger than 0 degree and less than or equal to 10 degrees.

3. A liquid crystal display device, comprising:
   a first substrate and a second substrate facing with the first substrate;
   a liquid crystal layer interposed between the first substrate and the second substrate;
   a pixel electrode formed over the first substrate;
   a common electrode formed over the second substrate with insulating from the pixel electrode, wherein a portion of the common electrode overlaps with the pixel electrode;
   a gray voltage generator generating a plurality of gray voltages;
   an image signal modification assembly configured to receive a first image signal, a second image signal, and a third image signal for subsequent three frames, and generate a first modified signal based on the first image signal and the second image signal and a second modified signal based on the first modified signal and the third image signal; and
   a data driver configured to provide a data voltage selected from the plurality of gray voltages to the pixel electrode corresponding to the second modified signal in the image signal modification assembly,
   wherein a longitudinal axis of the liquid crystal molecule is inclined at an angle with respect to a longitudinal axis of the pixel electrode,
   the second modified signal is disposed between a black voltage of the lowest gray and a white voltage of the highest gray.

4. The liquid crystal display device of claim 3, wherein the angle is larger than 0 degree and less than or equal to 10 degrees.

5. The liquid crystal display device of claim 3, wherein the pixel electrode has a bent portion.

6. The liquid crystal display device of claim 3, wherein the second modified signal is equal to a first correction constant when the first modified signal is less than a first value, and the third image signal is larger than a second value.

7. The liquid crystal display device of claim 3, wherein the second modified signal is equal to the sum of the first modified signal and a second correction constant when the first modified signal is less than a first value, and the third image signal is larger than a second value.

8. The liquid crystal display device of claim 6 or claim 7, wherein the second modified signal is equal to the first modified signal when the first modified signal is larger than the first value or the third image signal is less than the second value.

9. The liquid crystal display device of claim 8, wherein the modified first signal is larger than the second image signal when the first signal is less than the second image signal.

10. The liquid crystal display device of claim 3, wherein the image signal modification assembly comprises:
    a first frame memory configured to output the second image signal and store the third image signal;
    a second frame memory configured to output the first image signal and store the second image signal;

a first modification unit configured to generate the first modified signal based on the second image signal from the first frame memory and the first image signal from the second frame memory; and, a second modification unit configured to generate the second modified signal based on the first modified signal from the first modification unit and the third image signal.

11. The liquid crystal display device of the claim 3, wherein a portion of the pixel electrode and a portion of the common electrode overlap to form a storage capacitor.

12. A liquid crystal display device comprising:
a first substrate and a second substrate facing the first substrate;
a common electrode formed over either the first substrate or the second substrate;
a pixel electrode formed over the same substrate where the common electrode is formed;
a liquid crystal layer interposed between the first substrate and the second substrate;
a gray voltage generator generating a plurality of gray voltages;
an image signal modification assembly configured to receive a first image signal, a second image signal, and a third image signal for subsequent three frames, and generate a first modified signal based on the first image signal and the second image signal and a second modified signal based on the first modified signal and the third image signal; and,
a data driver configured to provide a data voltage selected from the plurality of gray voltages to the pixel electrode corresponding to the second modified signal in the image signal modification assembly,
wherein a longitudinal axis of a liquid crystal molecule is inclined at an angle with a longitudinal axis of the pixel electrode,
and a maximum value of the second modified signal is equal to a maximum of the first image signal, the second image signal, and the third image signal, and
the second modified signal is disposed between a black voltage of the lowest gray and a white voltage of the highest gray.

13. The liquid crystal display device of claim 12, wherein the angle is larger than 0 degree and less than or equal to 10 degrees.

14. The liquid crystal display device of claim 12, wherein the pixel electrode and the common electrode have transverse parts and longitudinal parts, wherein the longitudinal part has a bent shape.

15. The liquid crystal display device of claim 12, wherein the longitudinal parts of the pixel electrode are disposed alternately with and in parallel with the longitudinal parts of the common electrode.

16. A method for driving a liquid crystal display device including a pixel electrode and a common electrode formed over a same substrate, a plurality of pixel defined by a gate line and a data line, a liquid crystal molecule aligned between the pixel electrode and the common electrode, wherein the liquid crystal molecule is inclined at a range of angle larger than 0 degree and less than or equal to 10 degrees with a longitudinal direction of the pixel electrode comprising:
generating a plurality of gray voltages;
receiving a first image signal, a second image signal, and a third image signal for subsequent three frames;
generating a first modified signal based on the first image signal and the second image signal;
generating a second modified signal based on the first modified signal and the third image signal;
selecting a data voltage from the plurality of gray voltages corresponding to the second modified signal; and,
providing the data voltage to the pixel,
wherein the second modified signal is disposed between a black voltage of the lowest gray and a white voltage of the highest gray.

17. The method of claim 16, wherein generating the second modified signal further comprises:
comparing the first modified signal with a first value;
comparing the third image signal with a second value; and,
generating the second modified signal based on the comparison results.

18. The method of claim 17, wherein the second modified signal has a first correction constant when the first modified signal is less than the first value and the third image signal is larger than the second value.

19. The method of claim 18, wherein the second modified signal is equal to the first modified signal when the first modified signal is equal or larger than the first value, or the third image signal is equal or less than the second value.

20. The method of claim 17, wherein the second modified signal is equal to the sum of the first modified signal and a second correction constant when the first modified signal is less than the first value, or the third image signal is larger than the second value.

21. The method of claim 20, wherein the first modified signal is equal or larger than the second image signal when the first image signal is less than the second image signal.

* * * * *